Dec. 31, 1968
T. C. KEARNS
3,419,378
METHOD OF PRODUCING MONOAMMONIUM PHOSPHATE BY REACTING
PHOSPHORIC ACID AND AMMONIA UNDER PRESSURE
Filed April 1, 1965
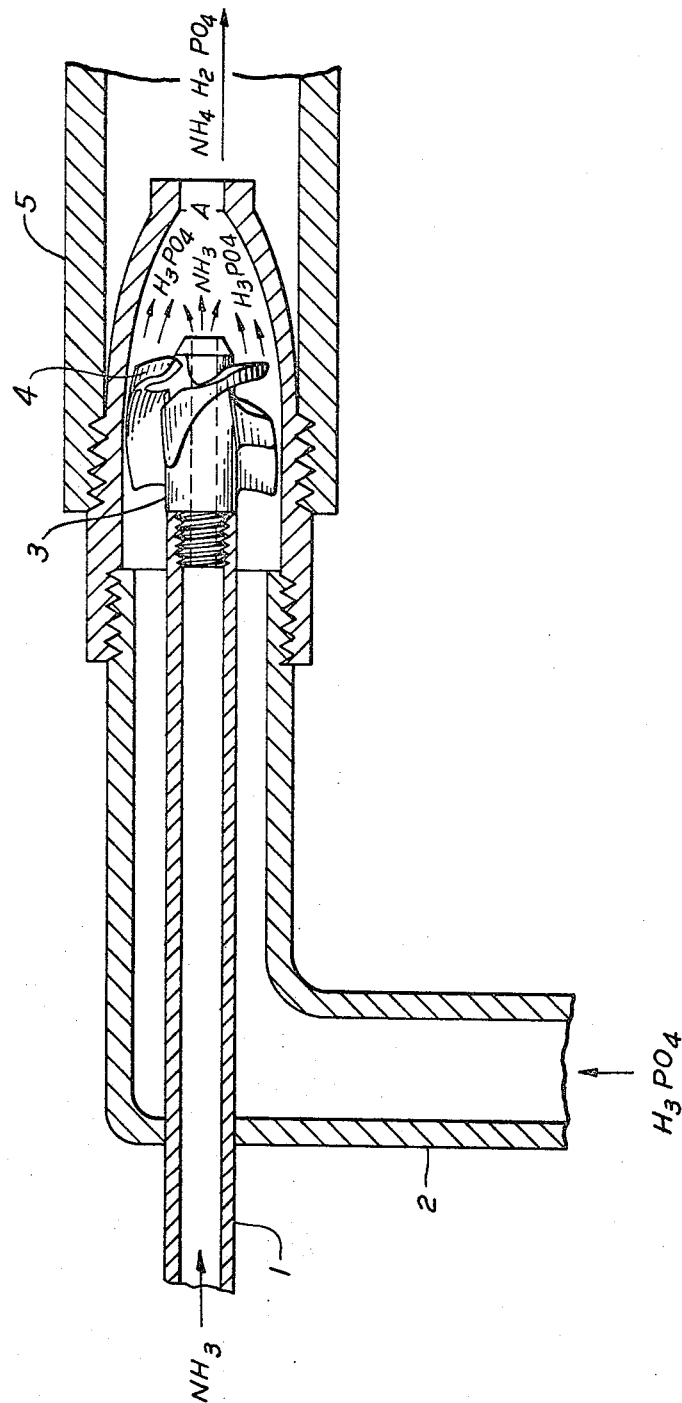
INVENTOR.
TOMMY C. KEARNS
BY
ATTORNEY.

United States Patent Office 3,419,378
Patented Dec. 31, 1968

3,419,378
METHOD OF PRODUCING MONOAMMONIUM PHOSPHATE BY REACTING PHOSPHORIC ACID AND AMMONIA UNDER PRESSURE
Tommy Carter Kearns, Homewood, Ill., assignor to Swift & Company, Chicago, Ill., a corporation of Illinois
Filed Apr. 1, 1965, Ser. No. 444,595
6 Claims. (Cl. 71—34)

ABSTRACT OF THE DISCLOSURE

A method is disclosed for forming monoammonium phosphate by reacting phosphoric acid and ammonia. The phosphoric acid is introduced into the reaction zone under a pressure of at least 50 p.s.i.g. The ammonia is under sufficient pressure to be maintained in the liquid state. The resulting compound is impelled through space in such a manner as to solidify and form a granular product.

---

This invention relates generally to the production of inorganic salts, either alone or in combination with fertilizer solids, both of which are suitable for use in growing plants. The invention concerns the production of salts which results from the treatment of ammoniacal materials with phosphorus-containing compositions, such as phosphoric acid. More specifically, this invention relates to a novel process of producing monoammonium phosphate and subsequent ammoniation of this intermediate to produce diammonium phosphate.

Complete fertilizers normally contain nitrogen, phosphorus and potassium, usually expressed as percentages of N, $P_2O_5$, and $K_2O$. However, two component fertilizers, that is, those containing nitrogen and phosphorus, are also of considerable importance. An ideal two-component fertilizer may be represented by ammoniated phosphate such as monoammonium and/or diammonium phosphate. The advantage of such concentrated materials is their handling costs, packaging, shipping, etc., all of which renders these compositions competitive with ordinary fertilizers. Also, the combination of the well-known plant foods, such as potassium chloride, ammonium nitrate, urea, etc., with diammonium phosphate and/or monoammonium phosphate is well-known and used throughout the industry and, accordingly, a cheap method for producing the ammonium phosphates is quite desirable.

Among the several advantages of diammonium phosphate are its high N to $P_2O_5$ ratio, its favorable pH in solution, i.e., about 7–8, its solubility in water and its high plant food content, i.e., an 18–46–0 product contains 64% total plant food. Monoammonium phosphate, 11–53–0 or 12–54–0, also has the advantage of concentration, i.e., 64–66% total plant food.

A recent advance in the art is a process which comprises spraying phosphoric acid on a rolling bed of already formed diammonium phosphate or fertilizer solids and ammoniating the phosphoric acid by injecting ammonia under the rolling bed of granular solids. In ammoniating the phosphoric acid to diammonium phosphate, a ratio of 2 mols of ammonia to 1 mol of phosphoric acid is required. In order to get this much ammonia to react with the phosphoric acid, the reaction has to be pushed with a large excess of ammonia which must be recovered and returned to the reaction zone. Furthermore, a recycle ratio of at least 3–1 and usually 5 or 6–1 of granulated solids, i.e., diammonium phosphate, is required to dilute the heat of reaction in order to keep the temperature of the ammoniator-granulator below about 220° F. (the decomposition temperature of the diammonium phosphate) and preferably below 200° F.

Another method of making diammonium phosphate is to pre-react phosphoric acid and aqueous ammonia in a tank in the liquid phase to a mol ratio of ammonia to acid of about 1.35 thus producing a water-ammonium phosphate slurry having about 20–22% moisture. This slurry is subsequently injected into an ammoniator-granulator onto a bed of fertilizer solids (when a diammonium phosphate-plant food combination is desired) or onto a bed of already formed diammonium phosphate (when only the diammonium phosphate is desired) and the solution is then ammoniated to a mol ratio of ammonia to acid of about 2.0. In such a system, large amounts of previously manufactured dry, granulated products are required to absorb the liquid. At least 4–8 tons, and in certain processes up to 12–15 tons, of already formed diammonium phosphate or other dry, granular fertilizer solids, as recycle, for each ton of diammonium phosphate produced is required. The high recycle requirement is necessary to dilute the heat of reaction, insure proper granulation, and as mentioned previously, absorb the liquid phase.

Another process of the art comprises ammoniating moist (10–15% water) crystalline monoammonium phosphate with gaseous ammonia to produce substantially dry crystalline diammonium phosphate. One of the several disadvantages of this process is that while the monoammonium phosphate is formed by the neutralization of aqueous phosphoric acid and ammonia, the free water must be removed by one means or another to produce the crystalline monoammonium phosphate salt. Furthermore, in ammoniating crystalline monoammonium phosphate, excess ammonia must be used to push the reaction which necessitates recycle of the ammonia.

In still another process, the ammoniation of substantially dry monoammonium phosphate with ammonia gas has been attempted; however, such a procedure has led to an unstable product. The product smells strongly of ammonia and is not acceptable as a commercial product. Since hard, dry, crystalline monoammonium phosphate is not a good absorber of ammonia, it is thought that the instability is due to the fact that the outside of the particles are converted to the unstable triammonium phosphate while the center of the particles contain unaltered monoammonium phosphate. In other words, the distribution of ammonia throughout the crystalline monoammonium phosphate granules is not uniform.

It is therefore an object of this invention to produce monoammonium phosphate which will ammoniate readily in ordinary granulating equipment wherein the ammonia is contacted for a short time and the excess ammonia required for completion of the reaction is small, thus making it practical to recover the ammonia and return it to the reaction zone.

Another object of this invention is to provide a continuous process for efficiently decreasing recycle requirements in the production of ammonium phosphates, thus producing a greater product yield for any given size equipment than was possible heretofore.

Another object of this invention is to provide a method for the production of a chemical source of nitrogen and phosphorus in a dry state suitable for marketing and transporting for subsequent use in liquid or solid plant foods.

Still another object is to provide a simple and cheap procedure for producing granular monoammonium phosphate by treating finely divided monoammonium phosphate with steam or water in a granulator, producing agglomeration to a desired size.

Additional objects, if not specifically set forth herein, will be readily apparent to those skilled in the art from the detailed description of the invention which follows.

Broadly, this invention relates to the production of ammoniated phosphates and more specifically to a novel process of producing monoammonium phosphate and the subsequent ammoniation of this intermediate to diammonium phosphate. It has now been discovered that, from a very simple device, phosphoric acid can be neutralized with anhydrous ammonia at amazing production rates to produce a dry, finely divided monoammonium phosphate having a large surface area which is excellent for absorbing ammonia to complete the reaction to diammonium phosphate. The finely divided monoammonium phosphate may be readily wetted by steam and water or additional phosphoric acid and ammonia, in correct ratio, to permit efficient agglomeration in a granulator. The thus produced granulated monoammonium phosphate, of any desired particle size, may be directly applied to the soil or may be blended with other plant food sources.

In general, the process of this invention comprises the steps of reacting ammonia and liquid phosphoric acid under pressure while carefully controlling the moisture content to form molten monoammonium phosphate; and impelling the molten monoammonium phosphate through space or other gaseous medium in such a manner that the molten monoammonium phosphate is allowed to solidify in flight. In accordance with the process of this invention the solidified monoammonium phosphate is in the form of dry, finely divided, largely spherical, porous particles which will absorb ammonia readily. The product does not normally require recycle of product in a ratio greater than one when used in the manufacture of diammonium phosphate.

More particularly, phosphoric acid, ammonia and water of dilution (usually present with the acid) are reacted in a two fluid reactor. The reaction product, as it emerges from the reactor, consists of molten monoammonium phosphate suspended in a high velocity stream of super-heated steam. The trajectory of the stream is such that the monoammonium phosphate solidifies into, tiny, round, porous, particles while in flight and before contacting any surface of the collection area. Steam and hot air escape from the stream while the monoammonium phosphate is in flight. In addition, the hot gasses are vented out of the top of the collection container. The settled monoammonium phosphate particles are removed from the collection area by any suitable means, such as a drag chain, and are charged into a granulator-ammoniator.

In one embodiment of the invention, the monoammonium phosphate may be impinged upon a solid surface while still molten and allowed to solidify. The solidified product can then be removed, for example by scraping, and ground to suitable size. However, ballistic solidification of the molten droplets is preferred.

A complete understanding of the invention will be attained by reference to the following description and drawing in which:

The figure is a cross-sectional view of a jet-type reactor wherein the vane is shown pictorially.

Referring now to the drawing, one embodiment of an apparatus used to carry out the process of the present invention comprises a two fluid nozzle jet-type reactor wherein ammonia reaches the reaction zone by means of conduit 1 and wherein the phosphoric acid reaches the reaction zone by means of conduit 2. Secured to conduit 1 is vane 3 having blades 4 which impart a centrifugal motion to the phosphoric acid stream. Secured to the reactor is a reaction pipe 5 which normally contains two 45° bends (not shown) to insure complete reaction of the reactants. Any means for imparting a vigorous centrifugal motion to the phosphoric acid prior to the contact with the ammonia may be used. For example, tangential entry, at high velocity, of the phosphoric acid into the annulus around the ammonia entry pipe may be utilized.

In carrying out the process of this invention, ammonia and phosphoric acid are supplied and reacted in a substantially 1 to 1 mole ratio. Normally, the phosphoric acid contains the desired amount of water of dilution, however, additional water may be supplied, if required, via conduit 1 or 2. If anhydrous ammonia is used the ammonia has a pressure sufficient to keep it in a liquid state and enable it to pass through ammonia conduit 1. At the point of contact, the ammonia will flash if anhydrous and react with the liquid phosphoric acid. The phosphoric acid will have a velocity leaving vane 3 of at least 750 feet per minute. In general there is no upper limit for the velocity of the acid. At point A in the drawing, the point of contact, the phosphoric acid having a density of three times that of the ammonia tends to surround the ammonia stream and prevent solids buildup in the reactor. Monoammonium phosphate will start to form at point A and will be completely formed by the time it exits pipe 5. The reaction product, as it emerges from the pipe, consists of molten monoammonium phosphate droplets suspended in a high velocity stream of super-heated steam. The holdup time of the reactants in the reactor is less than 1 second and the molten monoammonium phosphate and super-heated steam emerge from the reactor at a velocity estimated to be in the order of about 500 miles per hour.

The specific examples that follow are for illustrative purposes and are not to be construed as imposing limitations on the scope of the invention other than are set forth in the appended claims.

EXAMPLE I

The apparatus employed to carry out this example was a jet reactor consisting of a two fluid nozzle threaded into a pipe six feet long. The nozzle, which was operated at four TPH of dry product, consisted of a brass two fluid nozzle which was threaded into a three foot length of 1" pipe, then through two 90° ells and through another three foot length of 1½" pipe. The orifice of the nozzle was ½" diameter and the cross-sectional area of the vane openings was 0.174 square inch.

Wet process phosphoric acid, having a $P_2O_5$ content of 52% and a moisture content of 22%, was supplied to the reactor at a rate of 141 lb./min. while under 120 p.s.i.g. Liquid anhydrous ammonia at a rate of 17.8 lb./min. and under 120 p.s.i.g. was simultaneously supplied to the reactor. The reaction holdup time was less than 1 second and the reaction product, which was suspended in a high velocity stream of super-heated steam, consisted of molten droplets of monoammonium phosphate. The reactor was stationed about 3 feet off the floor and aimed at such an angle that the trajectory of the reaction stream was such that the molten monoammonium phosphate solidified into essentially dry, tiny, round, particles while in flight. The grade of the product analyzed 11.1–55–0.

The following is a screen analysis of the product.

| | Percent |
|---|---|
| −4+6 | 0.6 |
| −6+12 | 4.3 |
| −12+20 | 5.6 |
| −20+30 | 11.3 |
| −30+40 | 24.4 |
| −40+60 | 39.8 |
| −60+80 | 11.9 |
| −80+100 | 1.8 |
| −100+200 | 0.2 |
| −200 | 0.1 |

In general, the product will have a screen fraction of at least 80% in the range of −20+80. More specifically a screen fraction of −20+80 will comprise 85%–90% of the product.

EXAMPLE II

The apparatus employed to carry out this example was modified in that the orifice of the nozzle was enlarged to a ¾" diameter and the cross-sectional area of the vane openings increased to 0.428 square inch. The two fluid nozzle was threaded into a three foot length of 2"

pipe. Connected to this were two 45° elbows of three inch diameter and another three foot section of three inch pipe. This modification resulted in 16 TPH of product.

Wet process phosphoric acid, having a $P_2O_5$ content of 48% and a moisture content of 25%, was supplied to the reactor at a rate of 589 lb./min. under 160 p.s.i.g. Liquid anhydrous ammonia at a rate of 71.5 lb./min. and under a 140 p.s.i.g. was simultaneously supplied to the reactor. The reaction product was impelled through space and allowed to solidify in flight. The product analyzed 11–53–0. The product was a dry, (2–3% moisture) finely divided, free-flowing product which possessed excellent surface area and porosity for absorbing ammonia for conversion to diammonium phosphate.

EXAMPLE III

Furnace phosphoric acid produced by the combination of elemental phosphorous in the air and absorption of the resulting $P_2O_5$ in water to form a pure solution of phosphoric acid having a $P_2O_5$ content of 56.5%, and a water content of 22% was supplied to the reactor at a rate of 109 lb./min. and under 120 p.s.i.g. Liquid anhydrous ammonia at a rate of 14.7 lb./min. and under 120 p.s.i.g., was simultaneously supplied to the reactor. The product solidified in flight and analyzed 12.1–60.5–0.

EXAMPLE IV

The rate of ammonia absorption by various sources of monoammonium phosphate was studied to determine the difference in the rate of ammonia absorption by the product of this invention versus other forms of monoammonium phosphate. The testing was carried out as follows:

1000 grams of monoammonium phosphate adjusted to 3% moisture was mixed with 1000 grams of fine sand. The sand acted as a diluent to control the heat of reaction. The entire 2000 gram mixture was placed in a 3-liter glass resin reactor flask which was equipped with an outlet for drawing a vacuum, and an inlet for introducing ammonia gas. The reactor flask was sealed and the air removed by a water aspirator to an absolute pressure of 15–20 mm. Hg. At time zero, the vacuum outlet was closed off and ammonia gas was introduced quickly until the pressure returned to atmospheric and then regulated to maintain atmospheric pressure by controlling the inflow of anhydrous ammonia vapor. The rate of ammonia absorption by the monoammonium phosphate samples was measured by placing the ammonia containing pressure bomb on a laboratory balance. Continuous measurements of the ammonia weight loss vs. time was taken at 1–2 gram intervals for one hour. A blank was run containing the same amount of moisture only with 2000 grams of sand. Other sources included substantially pure, crystalline monoammonium phosphate samples having a screen fraction of −20+30 mesh and −40+70 mesh. Monoammonium phosphate samples of the product produced in accordance with this invention, and having a screen fraction of −20+30 mesh and −40+70 mesh, were also used. The conclusion drawn from the study indicated that the monoammonium phosphate made in accordance with the teachings of this invention ammoniates 5–10 times faster than pure crystalline monoammonium phosphate.

More in detail in regard to the production of the monoammonium phosphate, liquid ammonia under sufficient pressure to keep the ammonia in a liquid state, is reacted with liquid phosphoric acid under at least 50 p.s.i.g. pressure and having a centrifugal velocity of at least 750 feet per minute. At the point of contact, the phosphoric acid having a density of approximately three times that of the ammonia, tends to surround the ammonia stream thus preventing solids buildup in the reactor. The molten monoammonium phosphate and super-heated steam emerged from the reactor at a velocity estimated to be in the order of about 500 m.p.h. As the molten monoammonium phosphate solidifies, the steam and hot air escape leaving an essentially dry (less than 3% moisture) monoammonium phosphate, having a tremendous surface area, in finely divided form.

Accurate control of the amount of water entering the two fluid nozzle reactor is important as too much water results in a wet monoammonium phosphate. On the other hand, too little water results in a hot, dry monoammonium phosphate fused together in large, hard lumps which are exceedingly difficult to break up. In general, the phosphoric acid is controlled so that it contains about 22% to 25% water. Accordingly, the $P_2O_5$ value of the acid should range between 48% to 52% when wet process phosphoric acid, containing the usual impurities, is used. When furnace acid is used, the water content may be about 20% to 24% and the $P_2O_5$ content between 52% and 58%. One may also use phosphoric acid sludge resulting from precipitation and settling of insoluble materials naturally occurring in wet-process phosphoric acid. Such insoluble materials contain iron phosphates, aluminum phosphates, iron potassium phosphates, alkali, silicofluorides, organic matter etc. The acid sludge will normally analyze 40–55% $P_2O_5$, 10–25% water and 5–20% insoluble solids.

Conversion of the monoammonium phosphate to diammonium phosphate is accomplished by charging the monoammonium phosphate particles into a granulator-ammoniator, i.e., an inclined rotatable drum, thus forming a rolling, cascading bed of monoammonium phosphate solids flowing in a given direction. Liquid ammonia is injected, usually underneath the rolling bed substantially parallel to the axis of the granulator-ammoniator, in a quantity sufficient to substantially neutralize the monoammonium phosphate to diammonium phosphate. The diammonium phosphate is then withdrawn from the granulator dried and sized and the fines only are then recycled to the drum.

The ammoniation of the monoammonium phosphate to diammonium phosphate does not require any recycle to absorb a liquid phase or to dilute heat of reaction (the reasons for high recycle ratios in all the prior art processes) because both of these requirements have been eliminated in the preliminary neutralization step. However, the instant process, as well as all the prior art processes, requires an excess of ammonia fed to the granulator to drive the reaction to a mol ratio of 2.0. Accordingly, some phosphoric acid may be added to the system via a scrubbing tower in order to knock down and recover the excess ammonia and to produce more diammonium phosphate by feeding to the rolling bed of reacting monoammonium phosphate. This additional phosphoric acid requires recycle (as described in the prior art) and normally the fines, which are returned from the sizing operation, are sufficient to absorb the added phosphoric acid.

When high-grade, granular fertilizers are desired, fertilizer solids containing acid reacting phosphate solids, as well as the monoammonium phosphate are charged into the granulator-ammoniator and are neutralized with alkaline fluids injected beneath the bed of solids. Simultaneously, an acidulating medium comprising phosphoric acid or sulfuric acid may be sprayed upon the bed in a reciprocating manner. By fertilizer solids is meant acid reacting phosphates which are usually combined with potash; however, urea, ammonium nitrate, potassium nitrate, sulfate of potash, muriate of potash, monopotassium phosphate, as well as chelating agents and other plant nutrients may be present.

Obviously, many modifications and variations of the invention as hereinbefore set forth may be made without departing from the spirit and scope thereof and, thereof, only those limitations should be imposed as are indicated in the appended claims.

I claim:
1. A process for the production of free-flowing, finely divided monoammonium phosphate which comprises supplying to a reaction zone about a stoichiometric amount of liquid ammonia under sufficient pressure to keep the ammonia in the liquid state and liquid phosphoric acid under at least about 50 p.s.i.g., reacting said ammonia and said phosphoric acid in the reaction zone to form molten monoammonium phosphate, impelling said molten monoammonium phosphate through space whereby the monoammonium phosphate solifies in flight, and recovering substantially dry, finely divided monoammonium phosphate.

2. The process of claim 1 wherein the phosphoric acid is phosphoric acid sludge.

3. The process of claim 1 wherein the liquid ammonia is substantially anhydrous liquid ammonia and the liquid phosphoric acid is wet process acid, having a $P_2O_5$ content of between about 48% and about 52%, and having between about 22% and about 25% moisture.

4. The process of claim 1 wherein vigorous centrifugal motion is imparted to the $H_3PO_4$ prior to contact with the ammonia.

5. The process of claim 1 wherein the substantially dry, finely divided monoammonium phosphate is ammoniated to produce diammonium phosphate.

6. As a novel composition of matter, substantially spherical, finely divided monoammonium phosphate particles, said particles having been formed by the process which comprises supplying to a reaction zone about a stoichiometric amount of liquid ammonia under sufficient pressure to keep the ammonia in the liquid state and liquid phosphoric acid under at least about 50 p.s.i.g., reacting said ammonia and said phosphoric acid in the reaction zone to form molten monoammonium phosphate, impelling said molten monoammonium phosphate through space whereby the monoammonium phosphate solidifies in flight into substantially dry particles having a screen fraction of at least 80% in the range of —20+80 mesh.

References Cited

UNITED STATES PATENTS

| 1,785,375 | 12/1930 | Buchaman | 23—106 |
| 1,869,688 | 8/1932 | Heimann | 71—43 X |
| 2,999,006 | 9/1961 | Hodges | 71—43 X |
| 3,238,021 | 3/1966 | Webber et al. | 71—43 X |

DONALL H. SYLVESTER, *Primary Examiner.*

R. BAJEFSKY, *Assistant Examiner.*

U.S. Cl. X.R.

23—106; 71—43, 48